United States Patent

Nagatsuka et al.

[11] Patent Number: 5,242,768
[45] Date of Patent: Sep. 7, 1993

[54] THREE-DIMENSIONAL WOVEN FABRIC FOR BATTERY

[75] Inventors: Yoshihiro Nagatsuka, Tsukuba; Takeshi Kitano, Ushiku; Eiji Aoki, Tsukuba, all of Japan

[73] Assignees: Agency of Industrial Science & Technology; Ministry of International Trade & Industry, Tokyo, Japan

[21] Appl. No.: 850,999

[22] Filed: Mar. 12, 1992

[30] Foreign Application Priority Data

Apr. 1, 1991 [JP] Japan ............................ 3-094808

[51] Int. Cl.$^5$ ..................... H01M 2/16; H01M 6/18; D03D 15/02
[52] U.S. Cl. ..................... 429/127; 429/142; 429/191; 429/218; 429/220; 429/223; 139/DIG. 1; 139/425 R; 428/119; 428/257; 428/259
[58] Field of Search ............... 429/127, 123, 142, 192, 429/191, 218, 220, 223; 139/DIG. 1, 425 R; 428/119, 257, 259

[56] References Cited

U.S. PATENT DOCUMENTS

| | | | |
|---|---|---|---|
| 1,819,344 | 8/1931 | Slade | 139/425 R |
| 3,447,967 | 6/1969 | Hagarman | 429/123 X |
| 4,193,828 | 3/1980 | Moores et al. | 139/425 R |
| 4,336,296 | 6/1982 | Fukuta et al. | 139/DIG. 1 |
| 4,522,897 | 6/1985 | Walsh | 429/127 X |
| 4,615,256 | 10/1986 | Fukuta et al. | 87/33 |
| 4,925,752 | 5/1990 | Fauteux et al. | 429/192 X |

*Primary Examiner*—John S. Maples
*Attorney, Agent, or Firm*—Oblon, Spivak, McClelland, Maier & Neustadt

[57] ABSTRACT

A three-dimensional woven fabric for use in a battery is composed of three groups of filaments interlaced to form a three-dimensional weave, the filaments of one of the groups being formed of two kinds of electrode materials for a battery arranged parallely and alternately and the filaments of the other two groups serving as separators and being arranged so as to fix the filaments made of the electrode materials.

5 Claims, 2 Drawing Sheets

THREE-DIMENSIONAL WOVEN FABRIC FOR BATTERY

BACKGROUND OF THE INVENTION

1. Field of the Invention

This invention relates to a three-dimensional woven fabric, namely a material having component fibers interlaced in the three directions (X, Y, and Z) to be used for a battery.

2. Prior Art Statement

Generally, a battery is constructed to have an electrolyte interposed between a cathode and an anode. In the battery of this construction, the arrangement of a multiplicity of pairs of opposed electrodes in the battery so as to increase the capacity thereof requires special assembly work involving, for example, the fixing of cathodes and anodes through the medium of interposed separators. The assembly of such a multiplicity of pairs of opposed electrodes is not easy.

From the practical point of view, therefore, it is desired to develop a simple method of producing such an assembly of electrodes.

The inventors conducted a study on three-dimensional woven fabrics and were granted U.S. Pat. No. 4,615,256 for one of the inventions originating from this study.

The inventors continued their study for the purpose of developing an assembly of electrodes of the type mentioned above. As a result, they found that the application of the weaving technique for the three-dimensional woven fabric covered by U.S. Pat. No. 4,615,256 enables easy production of the assembly of electrodes aimed at. This invention has been accomplished as a result.

SUMMARY OF THE INVENTION

This invention is directed to a three-dimensional woven fabric for use in a battery, which three-dimensional woven fabric is composed of three groups of filaments interlaced in three intersecting directions to form a three-dimensional weave, the filaments of one of the groups being formed of two kinds of electrode materials for a battery arranged parallelly and alternately in such a manner as to avoid mutual contact and the filaments of the other two groups serving as separators and being arranged so as to fix the filaments made of the electrode materials.

For the fabric of this invention to operate as a battery, it has to be combined with an electrolyte.

The above and other features of the invention will become apparent from the following description made with reference to the accompanying drawings.

DESCRIPTION OF THE PREFERRED EMBODIMENTS

The three-dimensional woven fabric for a battery can be easily produced in a desired size by the use of the weaving technique for a three-dimensional woven fabric mentioned above. Specifically, in the weaving of filaments in the three (X, Y and Z) directions, the group of filaments laid in one direction are formed of the materials for forming the two kinds of battery electrodes, i.e. cathodes and anodes, and the individual filaments of this group are arranged parallelly in such a manner as to avoid mutual contact and the groups of filaments laid in the other directions serve as separators. This weaving of the three kinds of filaments results in formation of the three-dimensional woven fabric for use in a battery as aimed at by this invention.

The battery aimed at can be easily produced from the three-dimensional woven fabric obtained as described above by impregnating the filaments used in the weaving with a slurry prepared by the combination of a solid electrolyte with a macromolecular compound either in advance of or subsequently to the weaving operation.

The fabric for a battery according to this invention will now be described more specifically below with reference to the accompanying drawings.

Figure 1:
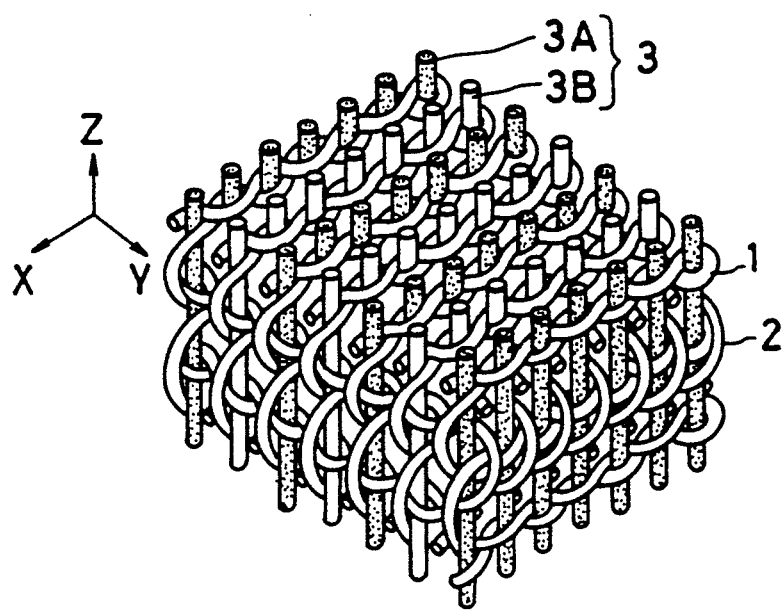
FIG. 1 is a diagram illustrating the basic construction of a fabric for a battery according to this invention.

FIG. 1 illustrates the basic construction of a three-dimensional woven fabric for use in a battery according to this invention. This fabric is formed as a three-dimensional woven fabric having the aforementioned groups of filaments 1, 2, and 3 (3A and 3B) interlaced as illustrated.

Of the three groups of filaments laid in three directions, the filaments of the group laid in the Z direction, namely the filaments of the two materials 3A and 3B, constitute cathodes and anodes in the battery.

When the fabric of this invention is used in a sea water battery incorporating sea water as an electrolyte, silver chloride, cuprous chloride, a combination of copper sulfate with graphite and a binding agent, lead dioxide, or nickel oxide is used for the cathodes and a magnesium alloy is used for the anode.

The groups of filaments 1 and 2 laid in the X and Y directions are serve as separators in the battery and are made of organic fibers or glass fibers, for example. These filaments, act as separators enabling the aforementioned filaments of the metallic substance 3A and 3B to be laid parallelly in such a manner as to avoid mutual contact.

The fabric for use in a battery according to this invention is possessed of the construction of a three-dimensional woven fabric and can be formed in a desired shape such as, for example, the shape of a panel or the shape of a column. This three-dimensional woven fabric can be used as part of a structure in such a manner that the filaments of the groups 1 and 2 laid in the X and Y directions are caused to bear the major part of the stress exerted on the structure.

Figure 2:
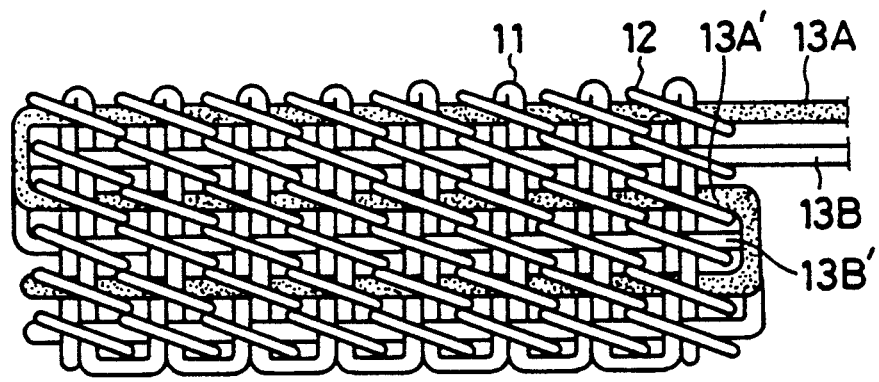
FIG. 2 is a diagram illustrating one example of the arrangement of one group of filaments made of two kinds of electrode materials in a fabric for a battery according to this invention.

FIG. 2 illustrates the filaments of cathode and anode materials arranged parallelly in such a manner as to avoid mutual contact and connected to the adjacent materials.

The adjacent filaments 13A, 13A' of cathode materials and the adjacent filaments 13B, 13B' of anode materials are respectively connected at their terminal parts. By 11 and 12 are denoted filaments of materials other than electrode materials. The current capacity and period of continuous current production of the battery can be varied by varying the manner in which the terminal parts of the filaments 13A, 13B are connected. The manner of connection of the adjacent filaments 13A, 13A', 13B, and 13B' of metals for electrodes is not be limited to that shown in the diagram and any other manner may be adopted insofar as it permits formation of a three-dimensional woven fabric.

The manner in which the three-dimensional woven fabric according to this invention is made to function as a battery will now be described.

The fabric acquires the function of a battery on being immersed in an electrolyte such as sea water.

The fabric of this invention assumes the basic construction of a battery when it is impregnated with an electrolyte.

The fabric of this invention allows use of a solid electrolyte in the construction of a battery.

Any of the solid electrolytes heretofore known to the art can be used for this purpose. From the practical point of view, the solid electrolyte is desired to be a macromolecular compound substance.

The macromolecular solid electrolyte is a mixture of a macromolecular compound with such an oxide as $LiClO_4$, $Al_2O_3$, or $ZrO_2$, for example. The macromolecular compounds which are effectively usable herein include polystyrenes and polyethers, for example.

The material obtained by impregnating the groups of filaments with a slurry prepared by melting a powdered solid electrolyte and a macromolecular compound such as a styrene-butadiene type rubber in an organic solvent and drying the impregnated groups of filaments and the material obtained by filling an overall mass of the groups of filaments with a liquid or pasty electrolyte are concrete examples of the aforementioned basic construction.

Figure 3:
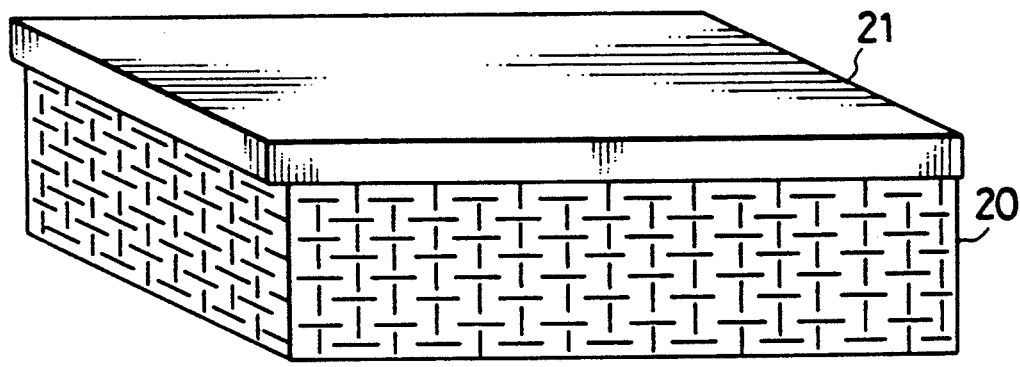
FIG. 3 is a diagram illustrating one example of fabric for a battery according to this invention using sea water as an electrolyte.

FIG. 3 illustrates a working example of the fabric for a battery mentioned above. In this working example, a fabric 20 according to this invention intended to use sea water as an electrolyte is produced by interlacing the component groups of filaments in the shape of a panel and has a floating member 21 attached thereto. This fabric 20 is floated in sea water and utilized as a power source for an unattended lighthouse, for example. In this working example, the floating member can be wholly omitted or appreciably reduced in size by using floating substances for the whole or part of the material of the groups of filaments.

In accordance with this invention, a fabric for a battery having a multiplicity of pairs of opposed electrodes arranged therein can be obtained by a simple procedure utilizing the weaving technique for a three-dimensional fabric as described above. Further, since the groups of filaments serving as electrodes are fixed by the group of filaments serving as separators, the fabric of this invention can be used by being directly immersed in an electrolyte without requiring the electrodes to be fixed in place by the use of a special case as is necessary in the conventional material for a battery.

Since the fabric for a battery according to this invention has a three-dimensional construction, it can be easily formed in any desired shape such as, for example, the shape of a panel or the shape of a column. Thus, the fabric can be used as part of a battery construction. The battery can be designed to produce different amounts of electric current by suitably selecting the manner of connection of the component electrodes. The batteries using the fabric of this invention can, therefore, be utilized as power sources having small to large electric current capacities.

What is claimed is:

1. A three-dimensional woven fabric, comprising three groups of filaments interlaced in three intersecting directions to form a three-dimensional weave;
   wherein the filaments of one of said three groups are formed of two different electrode materials and are arranged parallely and alternately in order to avoid mutual contact; and
   the filaments of the other two groups serve as separators and are arranged so as to hold said filaments of electrode materials immovable, wherein said filaments which serve as separators are prepared from materials which are different then the electrode materials.

2. A three-dimensional woven fabric according to claim 1, wherein the groups of filaments other than the group of filaments made of electrode materials, comprise at least one member selected from the group consisting of organic fibers and glass fibers.

3. A three-dimensional woven fabric, comprising three groups of filaments interlaced in three intersecting directions to form a three-dimensional weave;
   wherein the filaments of one of said three groups are formed of two different electrode materials and are arranged parallely and alternately in order to avoid mutual contact, wherein one of said two kinds of electrode material serve as cathodes and comprise at least one member selected from the group consisting of cuprous chloride, copper sulfate, copper dioxide, and nickel oxide; and
   the filaments of the other two groups serve as separators and are arranged so as to hold said filaments of electrode materials immovable.

4. A three-dimensional woven fabric, comprising three groups of filaments interlaced in three intersecting directions to form a three-dimensional weave;
   wherein the filaments of one of said three groups are formed of two different electrode materials and are arranged parallely and alternately in order to avoid mutual contact, wherein one of said two kinks of electrode materials serve as anodes and comprise magnesium; and
   the filaments of the other two groups serve as separators and are arranged so as to hold said filaments of electrode materials immovable.

5. A three-dimensional woven fabric, comprising three groups of filaments interlaced in three intersecting directions to form a three-dimensional weave;
   wherein the filaments of one of said three groups are formed of two different electrode materials and are arranged parallely and alternately in order to avoid mutual contact; and
   the filaments of the other two groups serve as separators and are arranged so as to hold said filaments of electrode materials immovable, wherein said three dimensional weave is impregnated with a solid electrolyte.

* * * * *